United States Patent
Agarwal et al.

(10) Patent No.: US 8,639,574 B2
(45) Date of Patent: *Jan. 28, 2014

(54) MANAGING ON LINE ADVERTISING USING A METRIC LIMIT, SUCH AS A MINIMUM PROFIT

(75) Inventors: Sumit Agarwal, Mountain View, CA (US); Thomas Korte, San Francisco, CA (US)

(73) Assignee: Google Inc., Mountain View, CA (US)

( * ) Notice: Subject to any disclaimer, the term of this patent is extended or adjusted under 35 U.S.C. 154(b) by 940 days.

This patent is subject to a terminal disclaimer.

(21) Appl. No.: 12/772,266

(22) Filed: May 3, 2010

(65) Prior Publication Data

US 2010/0211460 A1 Aug. 19, 2010

Related U.S. Application Data

(63) Continuation of application No. 10/953,861, filed on Sep. 29, 2004, now Pat. No. 7,734,503.

(51) Int. Cl.
*G06Q 30/00* (2012.01)

(52) U.S. Cl.
USPC .................. 705/14.43; 705/14.46; 705/14.48; 705/26.1

(58) Field of Classification Search
USPC ................ 705/14.43, 14.46, 14.48, 26.1
See application file for complete search history.

(56) References Cited

U.S. PATENT DOCUMENTS

| | | | |
|---|---|---|---|
| 2001/0014868 A1* | 8/2001 | Herz et al. | 705/14 |
| 2003/0023598 A1 | 1/2003 | Janakiraman et al. | |
| 2003/0046161 A1 | 3/2003 | Kamangar et al. | |
| 2003/0149622 A1 | 8/2003 | Singh et al. | |
| 2003/0220918 A1 | 11/2003 | Roy et al. | |
| 2004/0260588 A1* | 12/2004 | Bowen | 705/7 |

FOREIGN PATENT DOCUMENTS

| | | |
|---|---|---|
| KR | 2003-77953 | 10/2003 |
| WO | WO 01/04784 | 1/2001 |
| WO | WO 01/15053 | 3/2001 |

OTHER PUBLICATIONS

Notification of the Third Office Action for Chinese Patent Application No. 200580039330.0, mailed Nov. 24, 2011 (7 pgs.) with translation (10 pgs.).

(Continued)

*Primary Examiner* — Donald L. Champagne
(74) *Attorney, Agent, or Firm* — Foley and Lardner LLP; John D. Lanza

(57) ABSTRACT

To help advertisers to manage their online advertising, some business metric, such as ROI, profit, gross profit, etc., may be estimated and/or tracked with respect to an ad campaign, or a portion of the ad campaign. An advertiser may provide a business metric target, such as a target ROI, a target gross profit, a target profit, etc. An ad delivery system may then adjust information in an ad campaign (or a portion of an ad campaign) in an effort to meet the target. Similarly, an advertiser may provide a goal, such as maximizing or minimizing a business metric. The ad delivery system may then adjust information in an ad campaign (or a portion of an ad campaign) in an effort to meet the goal. The targets or goals may be subject to one or more constraints. The advertiser may provide limits on values of one or more business metrics. The ad delivery system may then turn off, or govern, the delivery of ads if the limits are violated.

22 Claims, 7 Drawing Sheets

(56) References Cited

OTHER PUBLICATIONS

Decision in the matter of Indian Patent Application No. 540/MUMNP/2007, with a cover letter, mailed Sep. 30, 2011 (17 pgs.).
Office Action for Canadian Patent Application No. 2,581,864, mailed Nov. 21, 20110 (4 pgs.).
Notification of the Second Office Action for Chinese Patent 200580039330.0, mailed Sep. 30, 2010 (8 pgs.) with translation (7 pgs.).
Office Action for Israeli Patent Application No. 182160, mailed Jul. 6, 2011 (2 pgs.).
Notice of Reasons for Rejection for Japanese Patent Application No. 2007-534671, mailed Jan. 18, 2011 (7 pgs.) with translation (11 pgs.).
Dio, Hideo, "Illustration Financial Management," *Toyo Keizai Inc*, 1st Edition (Oct. 19, 2000) pp. 125-130.
Matsumoto, Toshiaki, "Sony and Nifty Participates in the War of Email Advertisement Reaching Without Fail," *Nikkei Multimedia*, Japan, Nikkei Business Publications, Inc., No. 37, pp. 88-93 (Jul. 15, 1998).
Notice of Preliminary Rejection for Korean Patent Application No. 10-2010-7001690, mailed Dec. 17, 2010 (6 pgs.) with translation (8 pgs.).
Hearing Notice for Indian Patent Application No. 540/MUMNP/2007, mailed Mar. 7, 2011 (2 pgs.).
Notice of Preliminary Rejection for Korean Patent Application No. 10-2007-7009721, mailed Mar. 6, 2012 (3 pgs.) with translation (3 pgs.).

* cited by examiner

| AD GROUP ID | AD GROUP METRIC TARGETS | AD GROUP METRIC LIMITS |
|---|---|---|
| . . . | . . . | . . . |

510 ← 520, 530, 540

500

| AD CAMPAIGN ID | AD CAMPAIGN METRIC TARGETS | AD CAMPAIGN METRIC LIMITS |
|---|---|---|
| . . . | . . . | . . . |

610 ← 620, 630, 640

600

| AD ACCOUNT ID | AD ACCOUNT METRIC TARGETS | AD ACCOUNT METRIC LIMITS |
|---|---|---|
| . . . | . . . | . . . |

710 ← 720, 730, 740

700

MANAGING ON LINE ADVERTISING USING A METRIC LIMIT, SUCH AS A MINIMUM PROFIT

§0. RELATED APPLICATION(S)

This application is a continuation of U.S. patent application Ser. No. 10/953,861 (referred to as "the '861 application" and incorporated herein by reference), titled "MANAGING ON LINE ADVERTISING USING METRICS SUCH AS RETURN ON INVESTMENT AND/OR PROFIT," filed on Sep. 29, 2004 now U.S. Pat. No. 7,734,503, and listing Sumit AGARWAL, and Thomas KORTE as inventors.

§1. BACKGROUND OF THE INVENTION

§1.1 Field of the Invention

The present invention concerns advertising. In particular, the present invention concerns helping advertisers to manage online advertising.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.) Query keyword targeting has been used by search engines to deliver relevant ads. For example, the AdWords advertising system by Google of Mountain View, Calif., delivers ads targeted to keywords from search queries. Similarly, content targeted ad delivery systems have been proposed. For example, U.S. patent application Ser. No. 10/314,427 (incorporated herein by reference and referred to as "the '427 application") titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated by reference and referred to as "the '900 application") titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content targeted ad delivery systems, such as the AdSense advertising system by Google for example, have been used to serve ads on Web pages.

Regardless of whether or how ads are targeted, an advertiser typically compensates the content (e.g., Web page) owner (and perhaps an ad serving entity). Such compensation may occur whenever the ad is served (per impression), or may be subject to a condition precedent such as a selection, a conversion, etc. Compensation per selection (commonly referred to as "pay per click") is currently becoming popular.

Some advertisers might want to track return-on-investment (ROI) for advertising and manage their online advertising using ROI. Other advertisers might want to track other business metrics (e.g., profit) with respect to their advertising and manage their online advertising using such business metrics. Unfortunately, the complex interaction between advertisers within an online ad delivery system makes it difficult for advertisers to track, manage, or estimate ROI, and/or other business metrics.

Thus, it would be useful to help advertisers to track, and/or estimate certain business metrics, such as ROI, with respect to their advertising campaigns, and to help advertisers to use such business metrics to manage their advertising campaigns.

§2. SUMMARY OF THE INVENTION

Embodiments consistent with the present invention may be used to help advertisers to manage their online advertising. For example, at least one embodiment consistent with the present invention may do so by estimating and/or tracking some business metric, such as gross profit, with respect to an ad campaign, or a portion of the ad campaign.

In at least one embodiment consistent with the present invention, an advertiser may provide a business metric target, such as a target gross profit, etc. An ad delivery system may then adjust information in an ad campaign (or a portion of an ad campaign) in an effort to meet the target.

In at least one embodiment consistent with the present invention, the advertiser may provide at least one limit on values of one or more business metrics. The ad delivery system may then turn off, or govern, the delivery of ads if the limit(s) is violated.

§3. BRIEF DESCRIPTION OF THE DRAWINGS

§4. DETAILED DESCRIPTION

Figure 1:
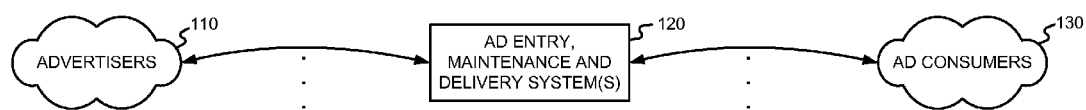
FIG. 1 is a block diagram illustrating parties that may participate in an online advertising market.

The present invention may involve novel methods, apparatus, message formats, and/or data structures for helping advertisers to track and/or manage their online advertising. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention to include any patentable subject matter described.

In the following, some terms that may be used in the specification are introduced in §4.1. Then, environments in which, or with which, the present invention may operate are described in §4.2. Exemplary embodiments of the present invention are then described in §4.3. Examples of operations are provided in §4.4. Finally, some conclusions regarding the present invention are set forth in §4.5.

§4.1 Definitions

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad. The selection rate of an ad rendered in an ad spot may be composed of various components such as a creative-specific selection rate (CSR), and a position-specific selection rate (PSR) for example. An estimated selection rate may be defined as the product of the component selection rates.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions or selections of the ad (i.e., the number of times an ad is rendered or selected) is referred to as the "conversion rate." If a conversion is defined to be able to occur within a predetermined time since the serving of an ad, one possible definition of the conversion rate might only consider ads that have been served more than the predetermined time in the past.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera), a media player (e.g., an MP3 player, a Realnetworks streaming audio or video file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

"Ad area" may be used to describe an area (e.g., spatial and/or temporal) of a document reserved or made available to accommodate the rendering of ads. For example, Web pages often allocate a number of spots where ads can be rendered, referred to as "ad spots". As another example, an audio program may allocate "ad time slots".

An "offer" is something presented for acceptance. In the context of the present invention, an offer will often be a monetary amount, associated with an advertisement, to be paid, upon the occurrence of an act with respect to the advertisement (e.g., impression, selection, conversion, etc.). An offer may be a bid. In some embodiments, rather than defining a precise value to be paid, an offer may specify a maximum and/or a minimum amount to be paid. An offer may be non-monetary.

An "arbitration" is a process for determining one or more winning participants competing for something. An auction is an example of an arbitration.

§4.2 Environments in Which, or with Which, the Present Invention May Operate

§4.2.1 Exemplary Advertising Environment

FIG. 1 is a high level diagram of an advertising environment. The environment may include an ad entry, maintenance and delivery system (simply referred to as an "ad server" or "ad delivery system") 120. Advertisers 110 may directly, or indirectly, enter, maintain, and track ad information in the system 120. The ads may be in the form of graphical ads such as so-called banner ads, text only ads, image ads, audio ads, animation ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or a selection related to the ad occurred) to the system 120. This usage information may include measured or observed user behavior related to ads that have been served.

Figure 2:
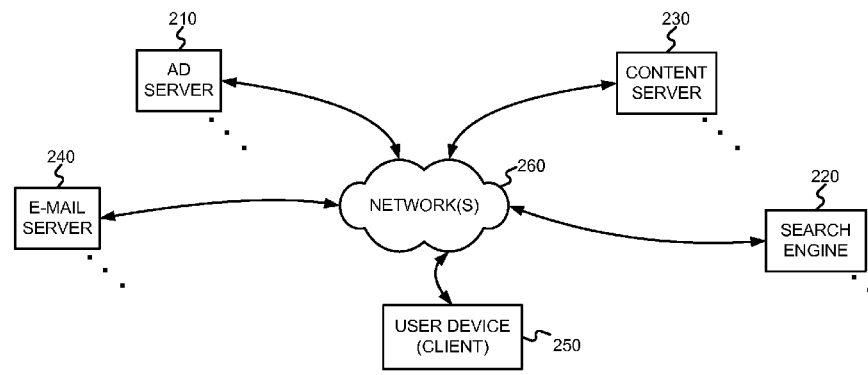
FIG. 2 is a block diagram illustrating an exemplary online advertising environment in which, or with which, the present invention may be used.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, etc.), some other content rendering facility, an e-mail facility (e.g., Outlook from Microsoft), etc. A search engine 220 may permit user devices 250 to search collections of documents (e.g., Web pages). A content server 210 may permit user devices 250 to access documents. An e-mail server (such as Gmail from Google, Hotmail from Microsoft Network, Yahoo Mail, etc.) 240 may be used to provide e-mail functionality to user devices 250. An ad server (also referred to as an "ad delivery system") 210 may be used to serve ads to user devices 250. For example, the ads may be served in association with search results provided by the search engine 220. Alternatively, or in addition, content-relevant ads may be served in association with content provided by the content server 230, and/or e-mail supported by the e-mail server 240 and/or user device e-mail facilities.

As discussed in the '900 application, ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., a Web page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information, including the document content and advertisement(s), is then forwarded towards the end user device 250 that requested the document for presentation to the user. Finally, the content server 230 may transmit information about the ads and how, when, and/or where the ads are to be rendered (e.g., position, selection or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference,* Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, and/or as described below, information related to, and/or derived from, the search query), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information, including the search results and advertisement(s), is then forwarded towards the user that submitted the search for presentation to the user. Preferably, the search results are maintained as distinct from the ads, so as not to confuse the user between paid advertisements and presumably neutral search results.

The search engine 220 may transmit information about the ad and when, where, and/or how the ad was to be rendered (e.g., position, click-through or not, impression time, impression date, size, conversion or not, etc.) back to the ad server 120/210. Such information may include information for determining on what basis the ad was determined relevant (e.g., strict or relaxed match, or exact, phrase, or broad match, etc.) Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.3 Exemplary Embodiments

The present invention may be used to help advertisers to track and/or manage their online advertising. For example, at least one embodiment consistent with the present invention may do so by estimating and/or tracking some business metric, such as ROI, profit, gross profit, etc. with respect to an ad campaign, or a portion of the ad campaign.

In at least one embodiment consistent with the present invention, an advertiser may provide a business metric target, such as a target ROI, a target gross profit, a target profit, etc. An ad delivery system may then adjust information in an ad campaign in an effort to meet the target. Similarly, in at least one embodiment consistent with the present invention, an advertiser may provide a goal, such as maximizing or minimizing a business metric. The ad delivery system may then adjust information in an ad campaign in an effort to meet the goal. In one embodiment consistent with the present invention, the targets or goals may be subject to one or more constraints (e.g., spend no more than x dollars per time period y, inventory is limited to N units per time period z, etc.)

In at least one embodiment consistent with the present invention, the advertiser may provide limits on values of one or more business metrics. The ad delivery system may then turn off, or govern, the delivery of ads if the limits are violated.

Figure 3:
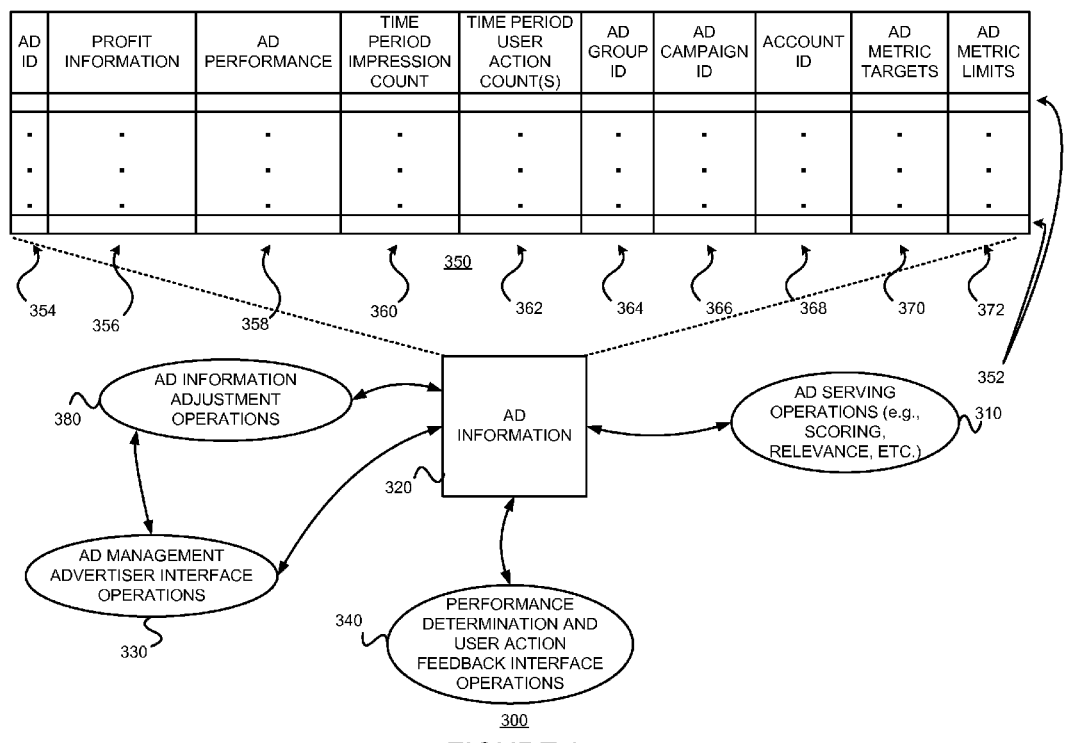
FIG. 3 is a bubble diagram of operations that may be performed in a manner consistent with the present invention, as well as information that may be generated and/or used by such operations.

FIG. 3 is a bubble diagram of operations that may be performed in a manner consistent with the present invention, as well as information that may be generated and/or used by such operations. As shown, an ad delivery system 300 may include ad serving operations 310, ad management advertiser interface operations 330, performance determination and user action feedback interface operations 340 and ad information adjustment operations 380. The various operations may use, populate, and/or modify ad information 320.

The ad serving operations 310 may include one or more of operations for determining the relevance of ads, operations for scoring (e.g., relevant) ads, and operations for governing ad serving using some metric (e.g., ROI, profit, etc.) limit. Operations for governing ad serving may govern ad serving automatically. Alternatively, such operations may govern ad serving after notification to the advertiser. Alternatively, or in addition, such operations may govern ad serving after advertiser notification and prior advertiser approval.

The ad management advertiser interface operations 330 may include one or more of operations to provide advertisers with information about their ad campaign(s), operations to accept advertiser input, etc.

The performance determination and user action feedback interface operations 340 may include one or more of operations to accept information about user actions (e.g., selections, conversions, etc.) with respect to an ad, operations to determine ad performance values (e.g., selection rate, conversion rate, etc.), and operations to determine one or more of various metrics (e.g., ROI, profit, etc.) with respect to the ads.

Finally, the ad information adjustment operations 380 may include operations for adjusting ad information in an effort to meet advertiser targets or goals, using one or more ad metrics. Such operations 380 may change ad information automatically. Alternatively, such operations 380 may change ad information only after advertiser notification. Alternatively, or in addition, prior advertiser approval may be required before such operations 380 change ad information. Such operations 380 may be run at the time of ad setup or entry. Alternatively, or in addition, such operations 380 may be run after the ad has been active (e.g., automatically at various times, and/or in response to an advertiser request).

Having described operations that may be performed in a manner consistent with the present invention, information that may be used and/or generated in a manner consistent with the present invention are now described in §4.3.1 below.

§4.3.1 Exemplary Data Structures

As shown, in at least one embodiment consistent with the invention, the ad information 320 may include a table 350 of information including a plurality of entries 352. Each of the entries 352 may include one or more of an ad identifier 354, profit information (e.g., profitability (or margin), gross profits, net profits, etc.) for advertised item(s) 356, ad performance information (e.g., selection rate, conversion rate, etc.) 358, an impression count over a given time period 360, a count of user actions (e.g., selections, conversions, etc.) over a given time period 362, an identifier of an ad group to which the ad belongs 364, an identifier of an ad campaign to which the ad belongs 366, an identifier of an account to which the ad belongs 368, one or more ad metric (e.g., ROI, profit) targets 370 and one or more ad metric limits 372. The profit information 356, ad metric target value(s) 370 and/or one or more ad metric limit value(s) 372 may have been provided by the advertiser, for example via ad management advertiser interface operations 330. The ad performance values 358, impression count values 360 and user action values 362 may have been provided via performance determination and user action feedback interface operations 340. The ad metric target value(s) 370 may be used by ad information adjustment operations 380. The ad metric limit value(s) 372 may be used by ad serving operations 310.

Figure 4:
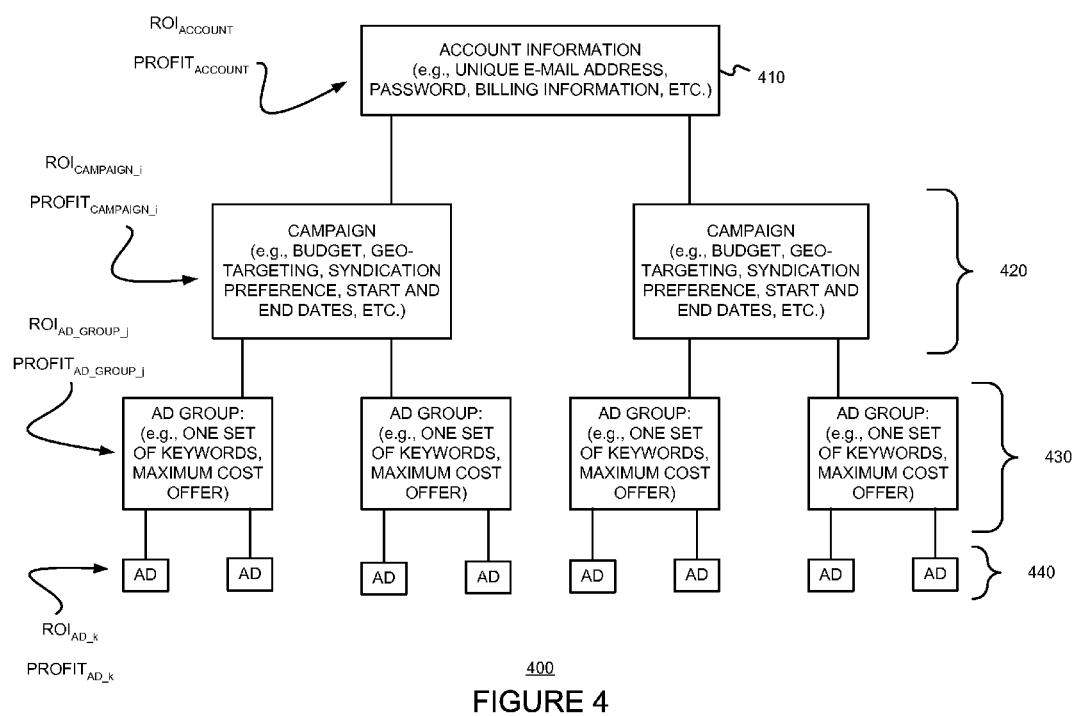
FIG. 4 is a diagram illustrating how advertiser information may be arranged for use by an ad delivery system, in a manner consistent with the present invention.

FIG. 4 illustrates an exemplary inter-relationship 400 of advertising information, some of which information may be organized in a manner consistent with the present invention. As shown, account information 410 may include, for example, a unique e-mail address, a password, billing information (e.g., a billing address, a credit card, etc.), etc. Accordingly, the term "account" relates to information for a given advertiser.

Account information 410 may be associated with information 420 about one or more campaigns. Campaign information 420 may include, for example, one or more budgets for one or more time periods (e.g., a daily budget), geo-targeting information, syndication preference information, start and end dates of the campaign, etc. For example, Honda may have one advertising campaign for its automobile line, and a separate advertising campaign for its motorcycle line.

Each campaign may be associated with information 430 about one or more ad groups. Ad group information 430 may include, for example, keywords (which may be used by relevancy determination operation(s) to decide whether or not to serve an ad), and cost information, such as a maximum offer per impression or user action for example.

Each ad group may be associated with information 440 about one or more ads. Ad information 440 may include, for example, content for the ad, a unique identifier, historical information about the ad or its performance, etc.

Naturally, other types of ad information, and/or arrangements of ad information may be used.

Figure 5:
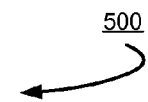
FIGS. 5-7 are diagrams illustrating how ad group, ad campaign, and ad account information, respectively, may be arranged for use by an ad delivery system, in a manner consistent with the present invention.
Figure 6:
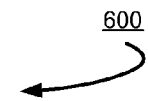
Figure 7:
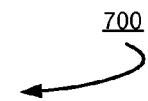

Consistent with the present invention, metric (e.g., ROI, profit, etc.) targets and/or limits may be associated with one or more ads 440, one or more ad groups 430, one or more campaigns 420, and/or the account 410. FIGS. 5-7 are diagrams illustrating how metric target and/or metric limit information may be associated with an ad group, an ad campaign, and an ad account, respectively, in a manner consistent with the present invention.

FIG. 5 illustrates a table 500 that includes a number of entries 510. Each of the entries 510 may include one or more of an ad group identifier 520, one or more ad group metric targets 530 and one or more ad group metric limits 540. Similarly, FIG. 6 illustrates a table 600 that includes a number of entries 610. Each of the entries 610 may include one or more of an ad campaign identifier 620, one or more ad campaign metric targets 630 and one or more ad campaign metric limits 640. Finally, FIG. 7 illustrates a table 700 that includes a number of entries 710. Each of the entries 710 may include one or more of an ad account identifier 720, one or more ad account metric targets 730 and one or more ad account metric limits 740.

Having described operations that may be performed in a manner consistent with the present invention, as well as information that may be used and/or generated in a manner consistent with the present invention, various exemplary methods that may be used to perform some of the various operations are now described in §4.3.2 below.

§4.3.2 Exemplary Methods

Figure 8:
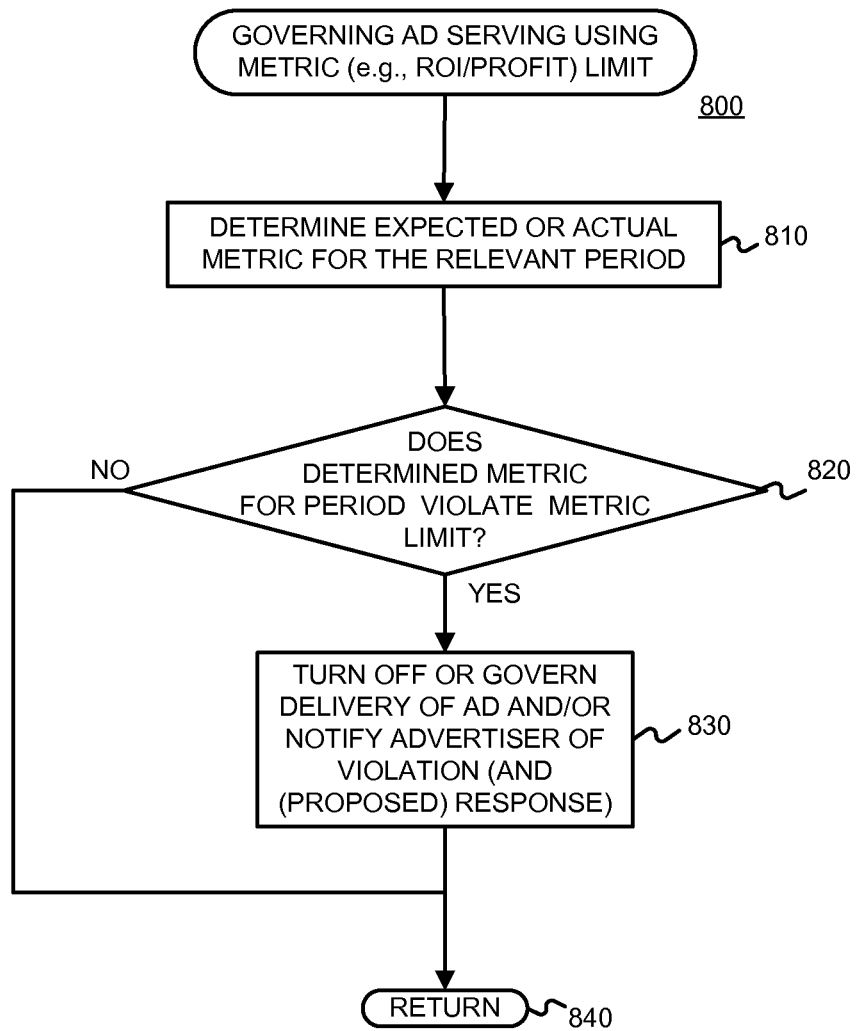
FIG. 8 is a flow diagram of an exemplary method that may be used to stop or govern the serving of ads, using a metric limit, in a manner consistent with the present invention.

FIG. 8 is a flow diagram of an exemplary method 800 that may be used to stop or govern the serving of ads, using one or more metric limits, in a manner consistent with the present invention. The method 800 may be one of operations 310 for example. The expected or actual metric for a relevant time period (e.g., past month, present month, next month, past week, present week next week, past quarter, present quarter, next quarter, etc.) is determined. (Block 810) Then, whether or not the determined metric for the period violates a corresponding metric limit is determined. (Block 820) If so, the delivery of the ad may be turned off, or governed in accordance with some policy (Block 830), before the method 800 is left (Node 840).

Referring to block 820, various metric limits can be used. For example, an advertiser may wish to stop the delivery an ad if its ROI becomes negative. As another example, an advertiser may wish to slow the delivery of an ad if its profit falls below a certain profit threshold. The metric limits may be applied at, and the metrics may be determined at, the level of an ad as described. Alternatively, or in addition, such application of metric limits and determination of metrics may be performed at the level of an ad group, an ad campaign, and/or the ad account.

Referring to block 830, a wide range of policies may be applied to the delivery of ads. The policy used to turn off or to govern the delivery of one or more ads may be applied at the level of ads, at the level of ad groups, at the level of campaigns, and/or at the level of accounts. For example, if the ROI of an ad group is negative, it may be turned off. Alternatively, suppose the ad group includes one or more ads having a positive ROI and one or more ads having a negative ROI. The policy may be to turn off delivery of only those ads with a negative ROI. As another example, suppose an ad has an upper profit limit and a lower profit limit. One policy may be to not govern the delivery of the ad at all if its determined profit exceeds the upper profit limit, to decrease the delivery of the ad by 50% if is determined profit (e.g., unit profit, or profit per selection or conversion) falls between the upper and lower profit limits, and to decrease the delivery of the ad by 95% if its determined profit falls below the lower profit limit. In yet another example, the governing of the delivery of the ad may be some defined function of the determined metric and the metric limit. As can be appreciated by those skilled in the art, the flexibility in choosing metric limits and policies provides a wide array of various controls to the advertiser.

Still referring to block 830, the method 800 may be used to govern or turn off an ad automatically. Alternatively, or in addition, the method 800 may simply be used to notify the advertiser of the limit of violation(s) or even expected future limit violations. Alternatively, or in addition, the method 800 may be used to notify the advertiser of a governing, or of a proposed governing. Alternatively, or in addition, the method 800 may wait for advertiser approval before turning off an ad, or governing the delivery of an ad.

The data used to determine the metric for the period may come from various sources. For example, when determining a metric such as ROI or profit, conversion rate (e.g., conversions per selection) information may be provided by the advertiser, may be tracked by the ad delivery system, and/or may be inferred from similar, and/or related ads. A cost per user action may be set (e.g., as provided by the advertiser). Profit information (e.g., revenue per conversion, profit margins, etc.) may be provided by the advertiser. Selections per time period may be determined using historic information for the ad, and/or historic selection information for related, and/or similar ads. Similarly, in ad delivery systems that discount maximum offers, an estimated cost may be determined using historic cost information for the ad, and/or historic cost information for related and/or similar ads.

Figure 9:
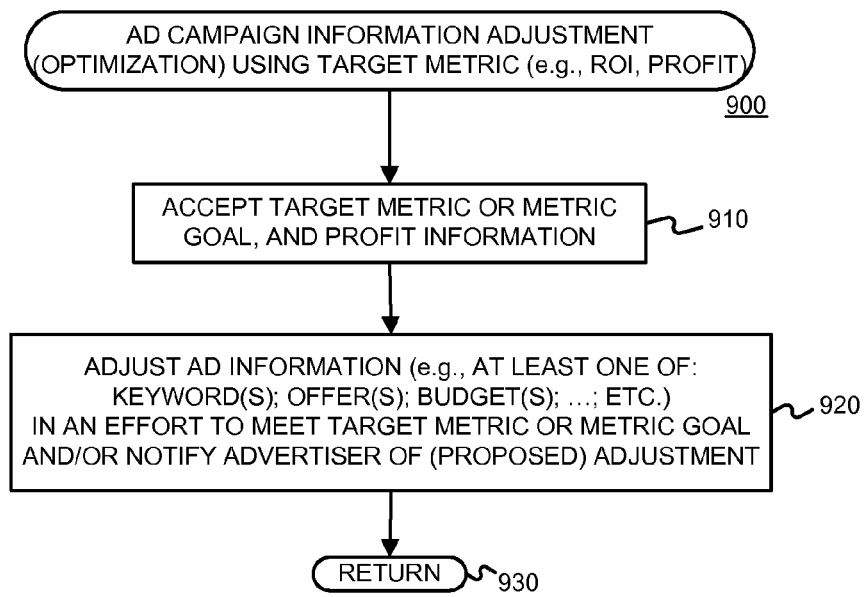
FIG. 9 is a flow diagram of an exemplary method that may be used to adjust ad information, using a target metric or metric goal, in a manner consistent with the present invention.

FIG. 9 is a flow diagram of an exemplary method 900 that may be used to adjust ad information, using a target metric or using a metric goal, in a manner consistent with the present invention. The method 900 may be used to perform operations 380. A target metric, or a metric goal, as well as profit information may be accepted. (Block 910) Then, ad information may be adjusted in an effort to meet the target metric or metric goal (Block 920) before the method 900 is left (Node 930).

Referring back to block 910, the profit information may include revenue per conversion and profit margin, and/or profit per conversion, etc., and may be provided by the advertiser. The target metric may be a specific value provided by the advertiser. Alternatively, the advertiser may have merely instructed that a metric be maximized or minimized.

Referring back to block 920, the adjustment of the ad information in an effort to meet the target metric may consider certain constraints. For example, although profit might be maximized if the advertiser spent $100,000 per month in advertising, the advertiser might have an ad budget of only $25,000 per month. This budget limit may be provided as a constraint, which may be used to constrain the adjustment. Similarly, although profit might be maximized if the advertiser sold 20,000 units per month, the advertiser might only have inventory or capacity to sell 10,000 units per month. This inventory or capacity limit may be provided as a constraint, which may be used to constrain the adjustment. As yet another example, an advertiser may specify that it wants to maximize its ROI, but subject to the constraint that it get at least 100 selections per week. As still another example, an advertiser may specify that it wants to maximize its ROI, but subject to the constraint that it needs to spend at least $1500.00 per week. Thus, one or more constraints may be used to constrain the adjustment.

Still referring to block 920, the method 900 may perform the adjustment automatically. Alternatively, or in addition, the method 900 may simply be used to notify the advertiser of the adjustment, or of a proposed adjustment. Alternatively, or in addition, the method 900 may wait for advertiser approval before performing the adjustment.

The adjustment of ad information may consider various data from various sources, such as that data and those sources discussed above with reference to FIG. 8.

Figure 10:
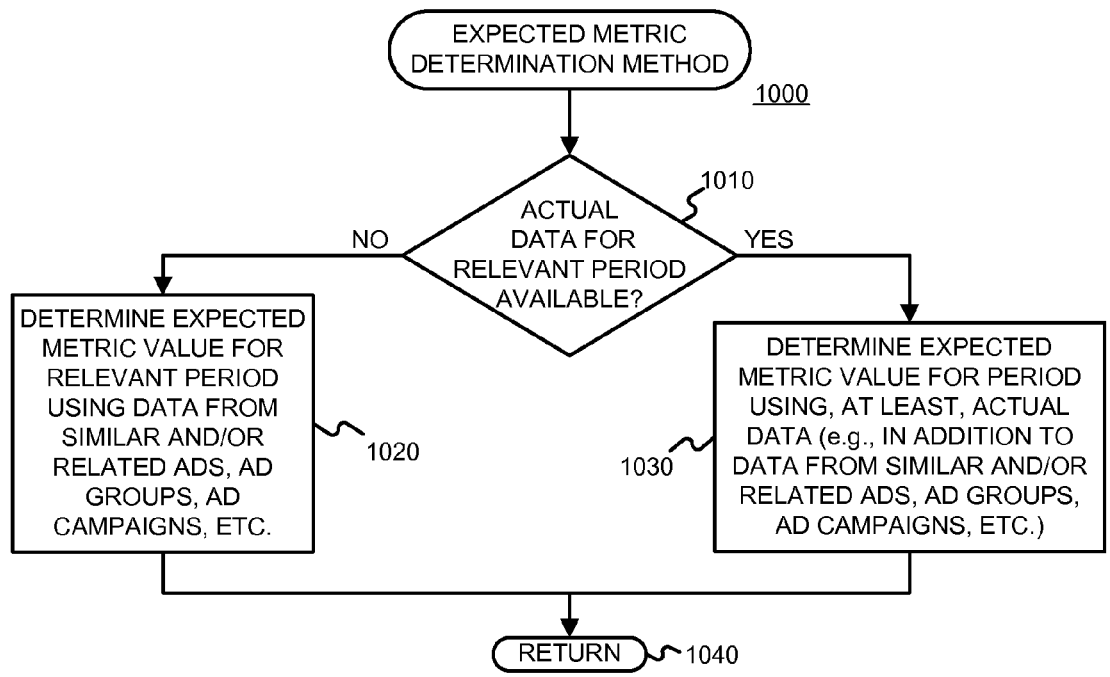
FIG. 10 is a flow diagram of an exemplary method that may be used to help determine an expected value for a metric in a manner consistent with the present invention.

FIG. 10 is a flow diagram of an exemplary method 1000 that may be used to determine an expected metric in a manner consistent with the present invention. The method 1000 may be performed as part of operations 340. Different metrics may be determined using different data. The data may come from various sources. As indicated by decision block 1010, the branch of the method 1000 performed may depend on whether or not there is actual data available for the ad for the relevant period. If not, the expected metric value for the relevant period may be determined using data from similar and/or related ads, similar, and/or related ad groups, similar and/or related ad campaigns, etc. (Block 1020), before the method 1000 is left (Node 1040). If, on the other hand, actual data is available for the relevant period, the expected metric value for the period may be determined using, at least, the actual metric value (Block 1030), before the method 1000 is left (Node 1040). Referring to block 1030, data from similar and/or related ads, similar and/or related ad groups, similar and/or related ad campaigns, etc., may also be used in determining the expected metric value.

Referring back to block 1020, suppose for example that a new ad is added to an existing ad group, and that all ads in the ad group are targeted using common keyword(s) and share a common maximum cost per selection offer. Even though the ad is new, information such as selections per week, or conversions per selection, for example, from existing ads in the ad group may be imputed to the new ad. As another example, suppose a totally new ad account is opened, with an ad targeted using a keyword and having a maximum offer per selection. Data from other ads targeted using the same keyword may be used to infer data used in determining metrics for the new ad.

The term "target ROI" or "target profit" should be broadly construed to include any predetermined ROI or profit, or an determinable ROI or profit. One example of a target ROI or profit is a daily ROI or profit.

§4.3.3 Exemplary Apparatus

Figure 11:
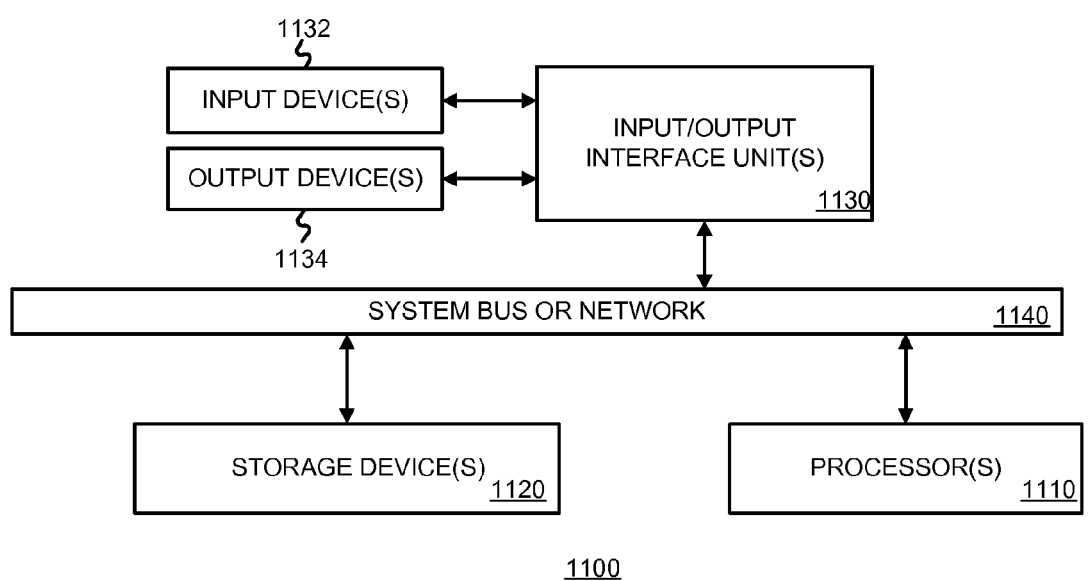
FIG. 11 is block diagram of a machine that may perform one or more operations and store information used and/or generated in a manner consistent with the present invention.

FIG. 11 is block diagram of a machine 1100 that may perform one or more of the operations discussed above. The machine 1100 may include one or more processors 1110, one or more input/output interface units 1130, one or more storage devices 1120, and one or more system buses and/or networks 1140 for facilitating the communication of information among the coupled elements. One or more input devices 1132 and one or more output devices 1134 may be coupled with the one or more input/output interfaces 1130.

The one or more processors 1110 may execute machine-executable instructions (e.g., C or C++, Java, etc., running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 1120 and/or may be received from an external source via one or more input interface units 1130.

In one embodiment, the machine 1100 may be one or more conventional personal computers. In this case, the processing units 1110 may be one or more microprocessors. The bus 1140 may include a system bus. The storage devices 1120 may include system memory, such as read only memory (ROM) and/or random access memory (RAM). The storage devices 1120 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1132, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1110 through an appropriate interface 1130 coupled to the system bus 1140. The output devices 1134 may include a monitor or other type of display device, which may also be connected to the system bus 1140 via an appropriate interface. In addition to (or instead of) the monitor, the personal computer may include other output devices (not shown), such as speakers and printers for example.

The various operations described above may be performed by one or more machines 1100, and the various information described above may be stored on one or more machines 1100. The ad server 210, search engine 220, content server 230, e-mail server 240, user device 250, and/or related ad link server 260 may include one or more machines 1100.

§4.3.4 Refinements and Alternatives

The ROI may be defined as:

$$ROI = \frac{\text{selections} * (\text{profit per selection} - \text{cost per selection})}{\text{selections} * \text{cost per selection}}$$

If profits and costs are fixed, this determination is straightforward. If a cost per selection changes, as may be the case in ad systems that discount maximum offers per selection, the cost per selection used in the ROI determination may be an average cost per selection. Although selections may be canceled from the definition of ROI, these terms are shown for the case where there are no selections, in which case ROI may be zero or undefined.

Although some of the foregoing examples were provided in terms of selections (e.g., profit per selection, cost per selection, etc.), metrics used may be in terms of some other user action, such as conversions for example.

Although many of the foregoing examples considered metrics of ads, the foregoing embodiments may be applied to ad groups, ad campaigns, and/or accounts.

Profits may be determined as the product, selections*conversions per selection*profit per conversion. Profit per conversion may be determined as the product, revenue per conversion*profit margin. Net profit may be profit less ad spend.

Conversions per selection may be provided by the advertiser, inferred from other data, or may be determined by mixing various sources.

User actions (e.g., selections, conversions, etc.) over some given time period may be estimated using historic data (e.g., past user actions) with respect to ads. Such historic data may be windowed to ignore certain time periods or to weight certain time periods more heavily. Trends in the historic data may also be considered with estimating user actions. Alternatively, or in addition, historic data from similar and/or related ads, ad groups, ad campaigns, etc., may be used when estimating user actions.

In embodiments in which an advertiser can enter a target metric, if the advertiser enters a metric that is unobtainable or not likely to be obtained, the advertiser may be provided with a notification of such facts.

The adjustment of ad information using one or more target metrics may be applied prospectively, when an advertiser is initiating a new ad. Alternatively, or in addition, the adjustment of ad information may be applied after an ad (or ad group, or ad campaign, or account) has been running. The adjustment of ad information may occur automatically, or may require prior advertiser approval.

§4.4 Examples of Operations

The following examples illustrate how an exemplary implementation of the present invention may be used to maximize ROI, and to maximize profit. The following examples assume that the advertiser sells $10.00 of items for each conversion, that 10 percent of selections lead to conversions (10% conversion rate) and that the advertiser's profit margin is 50 percent. The advertiser may provide such information directly. (Recall, e.g., operations 330.) The following example shows the affect of cost per selection (or cost per click (CPC)) on average ROI. (Note that the cost per selection may correspond to an offer per selection, or a discounted maximum offer per selection.)

Adjustment of Offer to Maximize ROI

| Profitability (Margin) | 50% | 50% | 50% | 50% | 50% | 50% |
|---|---|---|---|---|---|---|
| CPC | $ 0.49 | $ 0.50 | $ 0.65 | $ 0.75 | $ 0.95 | $ 1.00 |
| Conversions per Click | — | 10% | 10% | 10% | 10% | 10% |
| Revenue per Conversion | $10.00 | $ 10.00 | $ 10.00 | $ 10.00 | $ 10.00 | $ 10.00 |
| Clicks per day | 0 | 100 | 170 | 270 | 300 | 315 |
| Profit per Click | $ 1.00 | $ 1.00 | $ 1.00 | $ 1.00 | $ 1.00 | $ 1.00 |
| Ad Spend | 0 | $ 50 | $110.50 | $203 | $285 | $315 |
| Gross Rev | $ 0.00 | $100.00 | $170.00 | $270.00 | $300.00 | $315.00 |
| Adv ROI | 0 | 100% MAX ROI | 54% | 33% | 5% | 0% |

In this case, the profit per click is $1.00 (=10% of $10.00). The ROI is defined as:

$$ROI = \frac{\text{selections} * (\text{Average profit per selection} - \text{Average cost per selection})}{\text{selections} * \text{Average cost per selection}}$$

So, the ROI at $0.49 cpc is undefined, the ROI at $0.50 cpc is 1.00 (=(1.00−0.50)/0.50), the ROI at $0.65 cpc is 0.54 (=(1.00−0.65)/0.65), the ROI at $0.75 cpc is 0.33 (=(1.00−0.75)/0.75), the ROI at $0.95 cpc is 0.05 (=(1.00−0.95)/0.95) and the ROI at $1.00 cpc is 0.00 (=(1.00−1.00)/1.00). Thus, if the advertiser's goal is to maximize ROI, an offer that would cause their average cost per selection to be $0.50 could be selected.

The foregoing example presented a number of discrete cpc values for purposes of illustration. The present invention may use various optimization algorithms known to those skilled in the art, or proprietary optimization algorithms, to determine the cpc that maximizes ROI. Such algorithms may use many more discrete values, or continuous values.

Notice that if the average cpc were greater than $1.00, the ROI would be negative. Thus, for example, if the advertiser entered a ROI minimum limit of 0, and entered an offer that would cause its cost per selection to be greater than $1.00, the delivery of its ad could be stopped. Alternatively, in the case of a discounted maximum offer, the delivery of its ad could be governed so that it would only be served if its actual cost per selection would be less than $1.00.

Although it may be a goal of an advertiser to maximize ROI, higher ROI does not necessarily always lead to higher profits. For example, there may be a certain point at which a greater number of conversions at a lower ROI results in maximum profits. Thus, suppose the advertiser wants to maximize profits, given the same information as above, the following information may be determined.

| CPC | $ 0.50 | 0.65 | $ 0.75 | $ 0.95 | $ 1.00 |
|---|---|---|---|---|---|
| Amount Sold | 10 | 17 | 27 | 30 | 31.5 |
| Gross Revenue after Ad Spend | $50.00 | $59.50 | $67.00 | $15.00 | $ 0 |
| Profit | $25 | $29.75 | $33.50 MAX | $ 7.50 | $ 0 |
| Profit per product | $ 2.50 | $ 1.75 | $ 1.24 | $ 0.25 | $ 0.00 |

In this scenario, if the advertiser wants to maximize its profit, an offer that causes its average cpc to be $0.75 should be selected.

Still referring to the foregoing table, suppose that the advertiser can only sell 20 items per day. If the advertiser entered this constraint, but still sought to maximize its profit, an offer that causes its average cpc to be $0.65 should be selected.

The foregoing example presented a number of discrete cpc values for purposes of illustration. The present invention may use various optimization algorithms known to those skilled in the art, or proprietary optimization algorithms, to determine the cpc that maximizes profit. Such algorithms may use many more discrete values, or continuous values.

§4.5 Conclusions

As can be appreciated from the foregoing disclosure, the present invention can be used advantageously to help advertisers to manage their online advertising and their online ad campaigns using metrics considered to be important by the particular advertiser, such as ROI, profits, gross profits, etc. Constraints may be used to reflect advertiser limits, such as ad budget limits, inventory limits, sales volume limits, etc.

What is claimed is:

1. A computer-implemented method comprising:
    a) accepting, by a computer system including at least one computer, a metric limit, wherein the metric limit is a minimum profit after ad expense, and wherein profit is a value resulting from revenue*profit margin;
    b) determining, by the computer system, a metric for one or more ads, wherein the metric is a profit after ad expense;
    c) determining, by the computer system, whether or not the determined metric violates the metric limit; and
    d) reducing, by the computer system and responsive to a determination that the determined metric violates the metric limit, the serving of the one or more ads, wherein the serving of the one or more ads induces rendering of the one or more ads on a device for presentation to a user.

2. The computer-implemented method of claim 1, wherein the act of reducing the serving of the one or more ads includes stopping the serving of the one or more ads.

3. The computer-implemented method of claim 1, wherein the act of determining the metric for one or more ads uses profit information provided by an advertiser associated with the one or more ads.

4. A computer-implemented method comprising:
    a) accepting, by a computer system including at least one computer, a metric limit, wherein the metric limit is a minimum profit after ad expense, and wherein profit is a value resulting from revenue*profit margin;
    b) determining, by the computer system, a metric for one or more ads, wherein the metric is a profit after ad expense;
    c) determining, by the computer system, whether or not the determined metric violates the metric limit; and
    d) notifying, by the computer system and responsive to a determination that the determined metric violates the metric limit, an advertiser associated with the one or more ads of the violation.

5. The computer-implemented method of claim 4, further comprising:
    e) reducing, by the computer system, the serving of the one or more ads after advertiser approval of the reduction.

6. The computer-implemented method of claim 5, wherein the act of reducing the serving of the one or more ads includes stopping the serving of the one or more ads.

7. The computer-implemented method of claim 4, wherein the act of determining the metric for one or more ads uses profit information provided by an advertiser associated with the one or more ads.

8. A computer-implemented method comprising:
    a) accepting, by a computer system including at least one computer, a target metric value for one or more ads, wherein the target metric value is a target profit after ad delivery expense, wherein profit is value resulting from selections*conversions per selection*revenue per conversion*profit margin; and
    b) adjusting, by the computer system, ad information for at least some of the one or more ads in an effort to meet the target metric value.

9. The computer-implemented method of claim 8, wherein the act of adjusting ad information includes adjusting an offer per user action with respect to one or more ads.

10. The computer-implemented method of claim 8, wherein the act of adjusting ad information includes adjusting an offer per selection of one or more ads.

11. The computer-implemented method of claim 8, wherein the act of adjusting ad information includes adjusting an offer per conversion of one or more ads.

12. The computer-implemented method of claim 8, wherein the act of adjusting ad information includes adjusting an offer per impression of one or more ads.

13. The computer-implemented method of claim 8, wherein the act of adjusting ad information includes adjusting a maximum offer per user action with respect to one or more ads.

14. The computer-implemented method of claim 8, wherein the act of adjusting ad information includes adjusting a maximum offer per selection of one or more ads.

15. The computer-implemented method of claim 8, wherein the act of adjusting ad information includes adjusting a maximum offer per conversion of one or more ads.

16. The computer-implemented method of claim 8, wherein the act of adjusting ad information includes adjusting a maximum offer per impression of one or more ads.

17. The computer-implemented method of claim 8, wherein the act of adjusting ad information for at least some of the one or more ads uses profit information provided by an advertiser associated with the one or more ads.

18. The computer-implemented method of claim 8, wherein the act of adjusting ad information for at least some of the one or more ads uses constraint information provided by an advertiser associated with the one or more ads.

19. The computer-implemented method of claim 18, wherein the constraint information includes a budget constraint.

20. The computer-implemented method of claim 18, wherein the constraint information includes a constraint concerning a sales volume of goods that the advertiser can meet.

21. Apparatus comprising:
a) at least one processor;
b) an input for accepting a metric limit, wherein the metric limit is a minimum profit after ad expense, and wherein profit is a value resulting from revenue*profit margin; and
c) at least one storage device storing a computer executable code which, when executed by the at least one processor, performs a method of
  1) determining a metric for one or more ads, wherein the metric is a profit after ad expense,
  2) determining whether or not the determined metric violates the metric limit, and
  3) reducing the serving of the one or more ads in response to a determination that the determined metric violates the metric limit.

22. Apparatus comprising:
a) at least one processor;
b) an input for accepting a metric limit, wherein the metric limit is a minimum profit after ad expense, and wherein profit is a value resulting from revenue*profit margin; and
c) at least one storage device storing a computer executable code which, when executed by the at least one processor, performs a method of
  1) determining a metric for one or more ads, wherein the metric is a profit after ad expense,
  2) determining whether or not the determined metric violates the metric limit, and
  3) notifying an advertiser associated with the one or more ads of the violation in response to a determination that the determined metric violates the metric limit.

* * * * *